US011133010B1

(12) United States Patent
Waldmeier et al.

(10) Patent No.: US 11,133,010 B1
(45) Date of Patent: Sep. 28, 2021

(54) INTELLIGENT AGENT FOR INTERACTIVE SERVICE ENVIRONMENTS

(71) Applicant: United Services Automobile Association (USAA), San Antonio, TX (US)

(72) Inventors: Michael Waldmeier, Helotes, TX (US); Yuibi Fujimoto, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 112 days.

(21) Appl. No.: 15/877,464

(22) Filed: Jan. 23, 2018

(51) Int. Cl.
| | |
|---|---|
| *G10L 15/26* | (2006.01) |
| *H04M 3/51* | (2006.01) |
| *G06Q 30/00* | (2012.01) |
| *G06F 16/332* | (2019.01) |
| *G06F 40/284* | (2020.01) |

(52) U.S. Cl.
CPC .......... *G10L 15/26* (2013.01); *G06F 16/3329* (2019.01); *G06F 40/284* (2020.01); *G06Q 30/016* (2013.01); *H04M 3/5183* (2013.01)

(58) Field of Classification Search
CPC ............................ G06F 17/277; G10L 15/265
USPC ................................................ 704/270.1, 275
See application file for complete search history.

(56) References Cited

U.S. PATENT DOCUMENTS

| | | | | |
|---|---|---|---|---|
| 6,401,061 B1* | 6/2002 | Zieman | ............... | G06F 17/2755 704/1 |
| 6,970,821 B1* | 11/2005 | Shambaugh | .......... | G06F 17/277 379/88.01 |
| 7,103,553 B2* | 9/2006 | Applebaum | ........ | G10L 15/1822 704/235 |
| 7,487,095 B2* | 2/2009 | Hill | ...................... | G10L 15/1822 704/275 |
| 7,606,714 B2* | 10/2009 | Williams | ............... | G10L 13/027 704/275 |
| 8,442,209 B2* | 5/2013 | Waalkes | ............... | H04M 3/2281 379/265.02 |
| 9,172,805 B1 | 10/2015 | Jayapalan et al. | | |
| 2002/0031212 A1* | 3/2002 | O'Neil | ................ | H04M 3/5191 379/211.02 |
| 2004/0254904 A1* | 12/2004 | Nelken | ................... | G06N 5/022 706/50 |
| 2005/0138132 A1* | 6/2005 | Zhou | ....................... | H04L 51/04 709/207 |

(Continued)

*Primary Examiner* — Shaun Roberts
(74) *Attorney, Agent, or Firm* — Fletcher Yoder, P.C.

(57) ABSTRACT

Techniques are described for providing information during a service session, using an intelligent agent. The intelligent agent executes as a process to monitor communications exchanged during a service session between an individual and a service representative (SR) within a service environment. The agent analyzes the communications to identify questions or other topics that are posed by the individual during the service session. The agent retrieves stored data related to such questions or other topics, and generates a message to address each question or other topic. The message is injected into the service session to be presented to the individual, to supplement the conversation that is taking place between the SR and the individual. In some implementations, the agent monitors the communications, generates the message, and/or injects the message into the service session at least partly autonomously of any explicit action taken by the SR.

20 Claims, 5 Drawing Sheets

(56) References Cited

U.S. PATENT DOCUMENTS

| | | | | |
|---|---|---|---|---|
| 2006/0095273 | A1* | 5/2006 | Montvay | G06Q 50/188 |
| | | | | 379/266.08 |
| 2007/0094003 | A1* | 4/2007 | Huang | G10L 15/22 |
| | | | | 704/3 |
| 2007/0211881 | A1* | 9/2007 | Parker-Stephen | H04M 3/5133 |
| | | | | 379/265.01 |
| 2008/0256107 | A1* | 10/2008 | Banga | G06Q 10/00 |
| 2009/0171668 | A1* | 7/2009 | Sneyders | G06N 5/025 |
| | | | | 704/275 |
| 2014/0052445 | A1* | 2/2014 | Beckford | G10L 15/00 |
| | | | | 704/251 |
| 2016/0098393 | A1* | 4/2016 | Hebert | G06F 16/3344 |
| | | | | 704/9 |
| 2016/0110347 | A1* | 4/2016 | Kennewick, Jr. | G06F 16/3329 |
| | | | | 704/9 |
| 2016/0110422 | A1* | 4/2016 | Roytman | G06N 5/00 |
| | | | | 706/12 |
| 2017/0132203 | A1* | 5/2017 | Kim | G06F 16/35 |
| 2018/0144743 | A1* | 5/2018 | Aggarwal | G10L 15/22 |

* cited by examiner

INTELLIGENT AGENT FOR INTERACTIVE SERVICE ENVIRONMENTS

BACKGROUND

An organization may use any number of computing systems, communications networks, data storage devices, or other types of systems to provide service to customers or other individuals. An organization may also employ service representatives that use the various systems to assist individuals in service sessions that are conducted over the telephone, in a video conference, through text chat sessions, in person, or over other communication channels. Organizations generally strive to provide a calm and productive interaction between service representatives and the individuals being serviced, while maintaining an appropriate quality level for the service provided by service representatives.

SUMMARY

Implementations of the present disclosure are generally directed to providing information during a service session. More specifically, implementations are directed to an intelligent agent that monitors interactions between participants in a service session, and automatically generates appropriate information based on the communications exchanged during the session, and injects the information into the session to supplement the other information provided during the service session.

In general, innovative aspects of the subject matter described in this specification can be embodied in methods that includes operations of: monitoring communications sent by an individual during a service session between the individual and a service representative (SR); identifying a topic that is associated with at least one of the communications; retrieving data associated with the topic and, based on the retrieved data, composing a message related to the topic, wherein the identifying of the topic, the retrieving of the data, and the composing of the message are performed autonomously with respect to the SR and in real time with respect to the monitoring of communications during the service session; and presenting the message to the individual during the service session.

Implementations can optionally include one or more of the following features: the operations further include presenting the message to the SR through an SR application; the operations further include receiving a command to present the message to the individual, the command entered by the SR through the SR application; the presenting of the message to the individual during the service session is in response to receiving the command; the operations further include analyzing the communications to determine one or more candidate topics associated with the communications; the operations further include retrieving data associated with each of the one or more candidate topics and, based on the retrieved data, composing a plurality of candidate messages that includes at least one candidate message related to each respective candidate topic; the operations further include selecting the message to be presented from the plurality of candidate messages; selecting the message includes presenting the plurality of candidate messages through the SR application, and/or receiving a command that is provided through the SR application to select the message from the plurality of candidate messages; the service session is a text chat session; the message is presented as text in the text chat session; the message is presented with an indication that the message has been auto-generated; the presenting of the message to the individual during the service session is performed autonomously with respect to the SR; the topic is a question that is asked by the individual during the service session; the message is an answer to the question, the answer determined based on the retrieved data; identifying the topic further includes parsing text of the communications to determine one or more tokens included in the text, and/or determining the topic based on the one or more tokens; and/or determining the topic further includes providing the one or more tokens as input to a model that has been developed, using machine learning, to identify at least one topic based on one or more input tokens, and/or receiving the topic that is identified by the model based on the one or more tokens.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. In a traditional service environment implemented using previously available systems, a service representative (SR) engaged in a chat session or other service session with an individual is limited to discussing topics within the purview or expertise of the particular to whom the individual has been routed. For example, in a financial services customer service environment, a particular SR may specialize in answering questions regarding investments. If a customer also has questions about the balances of other types of accounts (e.g., checking, saving, etc.), the SR would traditionally need to re-route the customer to be serviced by a different type of specialized SR, leading to a loss of time, customer frustration, and computing system inefficiencies for repeated re-routing of customers. Implementations provide an intelligent agent to monitors a service session between an SR and an individual, identifies those questions that can be readily answered based on available information (e.g., "what is my checking account balance?"), and generates and presents answers to such questions autonomously of the conversation between the SR and the individual. This autonomous generation and presentation of information allows the SR and individual to continue with their main topic of conversation while the intelligent agent handles other topics (e.g., side questions that are off the main topic) that are answerable based on available information. Accordingly, implementations avoid the customer frustration caused by repeated re-routing that can occur in a traditional support environment, and implementations also avoid the expenditure of network bandwidth, processing power, active memory, and/or other computing resources that are expended by traditional environments to re-route or otherwise accommodate side requests from an individual. Because of the above-mentioned advantages and/or other advantages described herein, implementations also provide for a shorter service level agreement (SLA) for providing service within the service environment.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
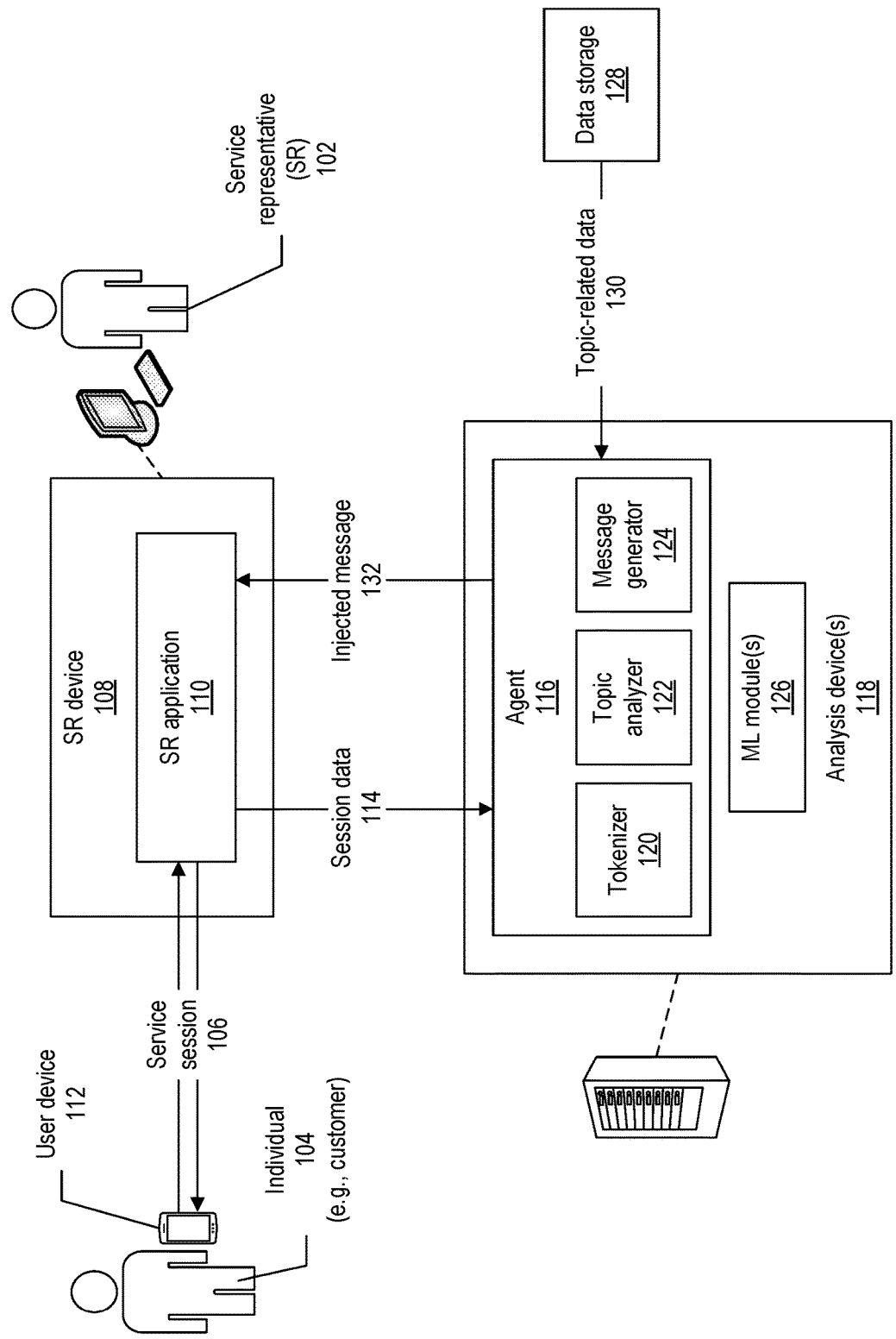
FIG. 1 depicts an example system for providing information during a service session, according to implementations of the present disclosure.

Implementations of the present disclosure are directed to systems, devices, methods, and computer-readable media for providing information during a service session. In some implementations, an intelligent agent executes as a process to monitor communications exchanged during a service session between an individual and a service representative (SR) within a service environment. The agent analyzes the communications (e.g., using natural language processing (NLP) or other techniques), to identify questions or other topics that are posed by the individual during the service session. The agent retrieves stored data related to such questions or other topics, and generates a message to address each question or other topic. The message is injected into the service session to be presented to the individual, to supplement the conversation that is taking place between the SR and the individual. In some implementations, the agent monitors the communications, generates the message, and/ or injects the message into the service session autonomously of any explicit action taken by the SR. In other words, the intelligent agent may operate independently of the SR, and answer questions from the serviced individual independently of the conversation that is otherwise taking place between the individual and the SR.

In some instances, a particular SR may be engaged in different service sessions with multiple customers at the same time, and the SR may be expected to retain all the pertinent information for each customer and conversation. This is typically a difficult task for an SR and may be an unrealistic expectation, given that an SR may have no reference history for the various conversations and their contexts. This in turn may lead to a sub-optimal interaction between the SR and customers. Implementations solve this problem by analyzing the communications (e.g., the lines of text) exchanged during a service session. Such analysis is performed in real time as the communications are sent during the service session, and identifies topics of conversation (e.g., questions asked by the customer) that can be answered autonomously of the SR. In some implementations, the intelligent agent automatically generates one or more candidate messages that can be injected into the conversation, based on a machine learning algorithm that predicts the topic (e.g., question) broached by the individual based on analysis of the individual's communications during the service session. The candidate message(s) are presented to the SR, who can then choose whether one of the message (s) is to be injected into the conversation.

In some implementations, the highest confidence candidate message is injected into the conversation automatically without requiring the prompting of the SR. In some implementations, the SR may be given the opportunity to edit the message before it is injected into the service session. Such editing allows those implementations that employ machine learning to create a highly accurate training set to update the predictive algorithm and increase its accuracy with more use. Implementations leverage natural language processing (NLP) and machine learning to assist SRs in their daily task, allowing them to better assist customers or other individuals during a service session.

FIG. 1 depicts an example system for providing information during a service session 106, according to implementations of the present disclosure. As shown in FIG. 1, a SR 102 may communicate with an individual 104 (e.g., a customer) during a service session 106. A SR 102 and an individual 104 may participate in a service session 106 in which the SR 102 attempts to assist the individual 104 with respect to services provided by an organization that employs or otherwise includes the SR 102. A service session 106 may include any number of communications between an individual 104 and a SR 102. In some examples, a service request (e.g., question, complaint, inquiry, etc.) may be received from an individual 104 via a telephone call, a real-time (e.g., text, audio, and/or video) chat session, text message, email, or other communications channel. A SR 102 may respond to the service request via a voice response, text response, or otherwise. The individual 104 may submit any number of follow-up questions, and the SR 102 may respond in turn. Accordingly, a service session 106 may constitute a conversation between the individual 104 and the SR 102 that includes any appropriate number of communications sent between the parties over any suitable period of time. The service session 106 may begin when the individual initially submits a service request and/or when the SR 102 initially responds to the service request. In some examples, the SR 102 may initiate the service session 106 by sending an initial communication to the individual 104.

The individual 104 (e.g., customer) may employ a user device 112 to send and receive communications during the service session 106. The user device 112 may be any suitable type of computing device, including portable computing devices (e.g., smartphone, tablet computer, wearable computer, etc.) or less portable computing devices (e.g., a personal computer, laptop computer, etc.). The user device 112 may execute a user application that enables the individual 104 to send and receive communications during the service session 106, or otherwise participate in the service session 106.

The SR 102 may employ a SR device 108, which may include any suitable type of computing device. The SR device 108 may execute a SR application 110 that facilitates the SR's communications with the individual 104 during service session(s) 106. For example, the SR application 110 may provide voice telephony services and/or audio/video chat functionality that enables the SR 102 to engage in a voice and/or video conversation with the individual 104. As another example, the SR application 110 may provide real time text chat functionality, that enables the SR 102 to exchange text messages with the individual 104, as well as audio files, video files, documents, and so forth.

In some implementations, session data 114 may be collected during a service session 106 between an SR 102 and the individual 104. The session data 114 can include one or more communications (e.g., voice, text, or otherwise) that are sent by the individual 104 during the service session 106. The session data 114 may be communicated, over one or more networks, to one or more analysis devices 118 that execute an agent 116, also described as an intelligent agent or autonomous agent. The analysis device(s) 118 may include any suitable number and type of computing device, such as server computer(s), distributed computing device(s) (e.g., cloud server(s)), and so forth. In some instances, the session data 114 may be collected by the SR application 110 during the service session 106. In some instances, the session data 114 may be collected by some other process that monitors the communications during the service session 106 and extracts the communications as the session data 114.

The session data 114 may include text data if the service session 106 is being conducted as a text chat session or some other exchange of messages that include text. The session data 114 may include audio and/or video data if the service session 106 is being conducted as a voice chat, audio chat, or video conference session using a telephone service, a voice over internet protocol (VOIP) service, a video chat service, and so forth. In scenarios where the service session 106 is a video chat session, the session data 114 may include individual frame image(s) or video stream data of the SR's face. In some implementations, the session data 114 may include voice data, text data, or other information extracted from the communications sent by the individual 104 in addition to, or instead of, session data 114 extracted from the communications sent by the SR 102. Audio data included in the session data 114 (e.g., collected during a voice and/or video chat session) may be transcribed using speech-to-text (STT) software to generate text data based on the audio data.

The agent 116 may analyze the session data 114 to determine one or more message(s) 132 that are suitable to be injected into the service session 106 (e.g., presented to the individual within the service session). In some implementations, the agent 116 includes a tokenizer 120, a topic analyzer 122, and a message generator 124. The tokenizer 120 can analyze the various communications sent by the individual 104 during the service session 106, and identify one or more tokens present in the communications. A token can be a word, multi-word phrase, character, sequence of characters, or other portion of (e.g., text) information that is present in the individual's communication(s). In some implementations, tokenization may be through parsing and/or NLP of the text in the communications. In instances where the service session 106 is being conducted as a telephone call, audio chat, and/or video chat session, the tokenization may be performed by analyzing text data that is at least a partial transcript of the individual's communications, where such a transcript is generated using an appropriate STT technique.

Based on the tokens output by the tokenizer 120, the topic analyzer 122 can identify one or more topics present in the communication(s) of the individual. A topic can be any suitable topic of conversation. For example, the individual can mention that they are looking to switch their homeowner's insurance provider while chatting with the SR about investments. In some instances, a topic may be an explicit question asked by the individual during the service session. For example, the individual may ask for a current account balance while they are otherwise chatting with the SR regarding their homeowner's insurance policy. In some instances, the topic identified may be different than the main topic of conversation between the individual and the SR during the service session, such that the identified topic may be a "side topic" or an aside (e.g., a secondary topic) that is introduced by the individual while the individual is discussing some other (e.g., primary) topic with the SR. In some implementations, the topic analyzer 122 can map the tokens to a topic, i.e., identify a topic based on a previously determined association between certain token(s) and certain topic(s). For example, the presence of the tokens "account," "balance," and "checking," in a communication, or at least a portion of those words as tokens, can be analyzed to infer that the topic is a request for a checking account balance. Moreover, in addition to analyzing the tokens themselves, the order in which the tokens appear (e.g., word order, phrases) can also be analyzed to provide better prediction of topic(s) indicated by the individual's communication(s).

A message generator 124 can receive the identified topic(s) from the topic analyzer 122, and generate one or more messages 132 based on the topic(s). In some implementations, the message generator 124 generates message(s) 132 based on topic-related data 130 that is stored in data storage 128. The data storage 128 may be local data storage that is included in the analysis device(s) 118. Alternatively, the data storage 128 can be external to the analysis device(s) 118 and accessible over one or more networks. The topic-related data 130 can be relevant to one or more of the topics identified by the topic analyzer 122. For example, if the topic analyzer 122 analyzes to tokens to determine that the individual has asked for the balance of their checking account, the topic-related data 130 can be a current balance of the individual's checking account. As another example, if the individual has broached a topic of homeowner's insurance during a chat session, the topic-related data 130 can include information regarding various homeowner's insurance policies that may be of interest to the individual.

In some implementations, the operations of one or more of the tokenizer 120, the topic analyzer 122, and/or the message generator 124 may be performed by a model that has been trained or otherwise developed by one or more machine learning (ML) modules 126.

Implementations may employ any suitable ML techniques, including supervised and/or unsupervised ML techniques. For example, the session data 114, or the token(s) generated by the tokenizer 120, may be provided as input to the ML-trained model, which predicts one or more topics based on the input. The predicted topics may be output, each with a confidence score (e.g., metric) indicating a degree of confidence that the topic is actually present in the communications of the individual.

In some implementations, the message(s) 132 are communicated to the SR application 110 and presented to the SR 102 in a user interface (UI) of the SR application 110. The message(s) 132 may be presented as a list to the SR 102, and the SR 102 may choose one or more of the message(s) 132 to be injected into the service session 106 and presented to the individual 104. In some implementations, the message(s) may be presented in a list that is ordered according to the confidence score of each message. For example, the message with the highest confidence score can be presented first in the list, with any other message(s) presented in descending order according to confidence score. In some implementations, the message with the highest confidence score can be communicated to the SR application 110 and automatically injected into the service session 106 without requiring any explicit selection from the SR 102.

In some implementations, the collection and analysis of the session data, and the generation of the message(s), may be performed autonomously of any other actions that are performed by the SR during the service session 106. In this way, the agent 116 can operate independently of, and autonomously with respect to, the SR 102 during the service session 106. Autonomous operations can include operations that are performed without requiring an explicit command from the SR 102. For example, the SR and the individual may be chatting in a text service session about some topic, and the agent 116 may (e.g., in the background) monitor the communications of the individual and autonomously identify topic(s) (e.g., questions) that may be suitable to be addressed by injected message(s) 132 that are automatically generated based on the agent's analysis of the individual's communications. In some implementations, the analysis of the session data 114 and the generation of message(s) 132 is performed autonomously of the SR 102, and the SR 102 selects which of the automatically generated message(s) 132 are to be injected into the service session 106. In some implementations, the injection of the highest confidence message 132 is also performed autonomously of the SR 102, without requiring any explicit SR selection of the particular message 132 to be injected.

In some implementations, one or more of the collection of the session data 114, the analysis of the session data 114, the generation of the message(s) 132, and/or the injection of message(s) 132 into the service session 106 may be performed in real time with respect to the exchange of communications during the service session 106. In some implementations, the analysis of the session data 114 to generate the message(s) 132 may be performed in real time with respect to the collection and/or receipt of the session data 114 during the service session 106. The presentation of the message(s) 132 to the SR 102 for selection and injection may also be performed in real time with respect to the collection, receipt, and/or analysis of the session data 114 to generate the message(s) 132.

As used herein, a real time operation may describe an operation that is performed based on triggering event and without any intentional delay between the performed operation and the triggering event, taking into account the processing and/or communication limitations of the computing system(s) performing the operation and the time needed to initiate and/or perform the operation. The triggering event may be a received communication, a detection of a particular application state, another operation performed by the same or a different process, and so forth. A real time operation may also be described as a dynamic operation. Real time operations may include operations that are automatically executed in response to the triggering event without requiring human input. In some examples, a real time operation may be performed within a same execution path as a process that detects and/or handles the triggering event. For example, the real time operation may be performed or initiated by code that executes as part of the handling of the event and/or in response to a message that is sent as part of the handling of the event. A real time operation may, in at least some instances, be performed synchronously with respect to the triggering event.

In some implementations, receipt of the session data 114 (e.g., of each communication from the individual during the service session) is the triggering event that triggers the analysis of the session data 114 and generation of message(s) 132. Accordingly, the analysis of the communications sent by the individual 104 during the session may be ongoing as long as the session is active, and each communication can be analyzed (e.g., alone or in combination with other communication(s)) to identify topic(s) that are being introduced by the individual during the service session 106.

In some implementations, the SR 102 can select from the generated message(s) 132 to determine which of the message(s) 132, if any, are to be injected into the service session 106 and presented to the individual 104. In some implementations, the SR 102 can use the UI of the SR application 110 to modify the message(s) 132 prior to their injection into the service session 106. In some implementations, the selection of the particular message(s) and/or modification of the message(s) can be used as input to further train and refine the ML-trained model that is used to identify topics and/or generate message(s).

In instances where the service session 106 is being conducted as a text chat session between the individual 104 and the SR 102, the injection of the message(s) 132 may be a presentation of the message(s) 132 as text in the chat windows of the participants. In some implementations, the injected message(s) 132 may be presented in the chat window with some symbol, icon, or other perceivable indication that the message(s) 132 may be auto-generated by the intelligent agent. In instances where the service session 106 is being conducted as a voice chat session, such as a telephone call, voice over IP (VOIP) session, video chat session, and so forth, the SR 102 may speak the message(s) 132 to present them to the individual 104. Alternatively, the message(s) 132 may be injected into the conversation through computer speech using a suitable text-to-speech (TTS) engine.

In some instances, the topic identified by the communications may be a question that has been asked by the individual 104 during an (e.g., unrelated) conversation. For example, the individual can ask for a bank account balance while discussing other types of products or services supported by the SR 102. In such instances, the injected message may be the individual's current account balance. In some instances, the topic may be the individual's mention of some other area where it may be appropriate to provide information to the individual regarding other services that are available to the individual (e.g., for purchase or otherwise). For example, during a conversation regarding the individual's investments, the individual may mention their classic car collection, or may mention having purchased a new home. In such instances, the injected message may be information describing other insurance policies that the individual may wish to take out to protect their car collection or new home.

In some instances, the prediction of topic(s) may be further based on other contextual information regarding the individual 104, such as the individual's demographic characteristics, location, user account information, and/or other recent online activities browsing for products or services offered by the organization supported by the service environment. In some instances, the agent 116 may be able to infer a topic and generate message(s) based on an initial analysis of the individual's communications. For example, the individual may ask for their account balance, and the agent 116 may retrieve topic-related data 130 indicating that the individual 104 owns only one account with the organization. Accordingly, the agent 116 may infer that the individual is asking about the balance for their one account. In some instances, there may be some initial ambiguity regarding the topic that the individual has broached. For example, if the individual 104 owns multiple accounts it may be unclear which account balance they are asking for. In such instances, the injected message(s) 132 may initially include a question to clarify which account. Based on the individual's answer to the follow-up question (e.g., "checking"), the topic may be determined as "checking account balance" and the message 132 to answer that question can be generated based on the retrieved data 130 that indicates the current checking account balance. In this way, the agent 116 (e.g., intermediated by the SR 102 or not) could effectively carry on independent message thread with individual 104 in the chat session while the SR 102 discusses the main topic of conversation with the individual 104. The intelligent agent 116 may assist the SR 102 in providing information to the individual 104 regarding those topics that are more data-driven and/or deterministic, e.g., topic(s) in which an exact answer is possible based on available data 130.

In some implementations, the agent 116 can monitor the communications during the service session 106 and keep track of the context of the conversation, such as the various topics that have been brought up during the conversation. The SR application 110 may receive topic information including a list of the topic(s) that have been mentioned or brought up during the conversation between the SR and the individual, as identified by the agent 116 based on its analysis of the session data 114. The SR application 110 can present a current list of the topics (e.g., updated on an ongoing basis as the conversation evolves) to help the SR 102 track those questions or other topics yet to be addressed during the conversation.

In some implementations, the agent 116 can also identify the presence of acronyms, jargon, or other specialized language that is used by the individual during the service session 106. The agent 116 can provide a description of such language to be presented through the SR application 110 to the SR 102 during the conversation, to help the SR 102 better understand the individual 104.

In some implementations, the message(s) 132 may be generated with some randomization in the output language, to make the message(s) 132 seem more natural. For example, a same answer to a question may be worded differently in different instances within a same service session 106 or across different service sessions 106 with different individuals 104.

Figure 2:
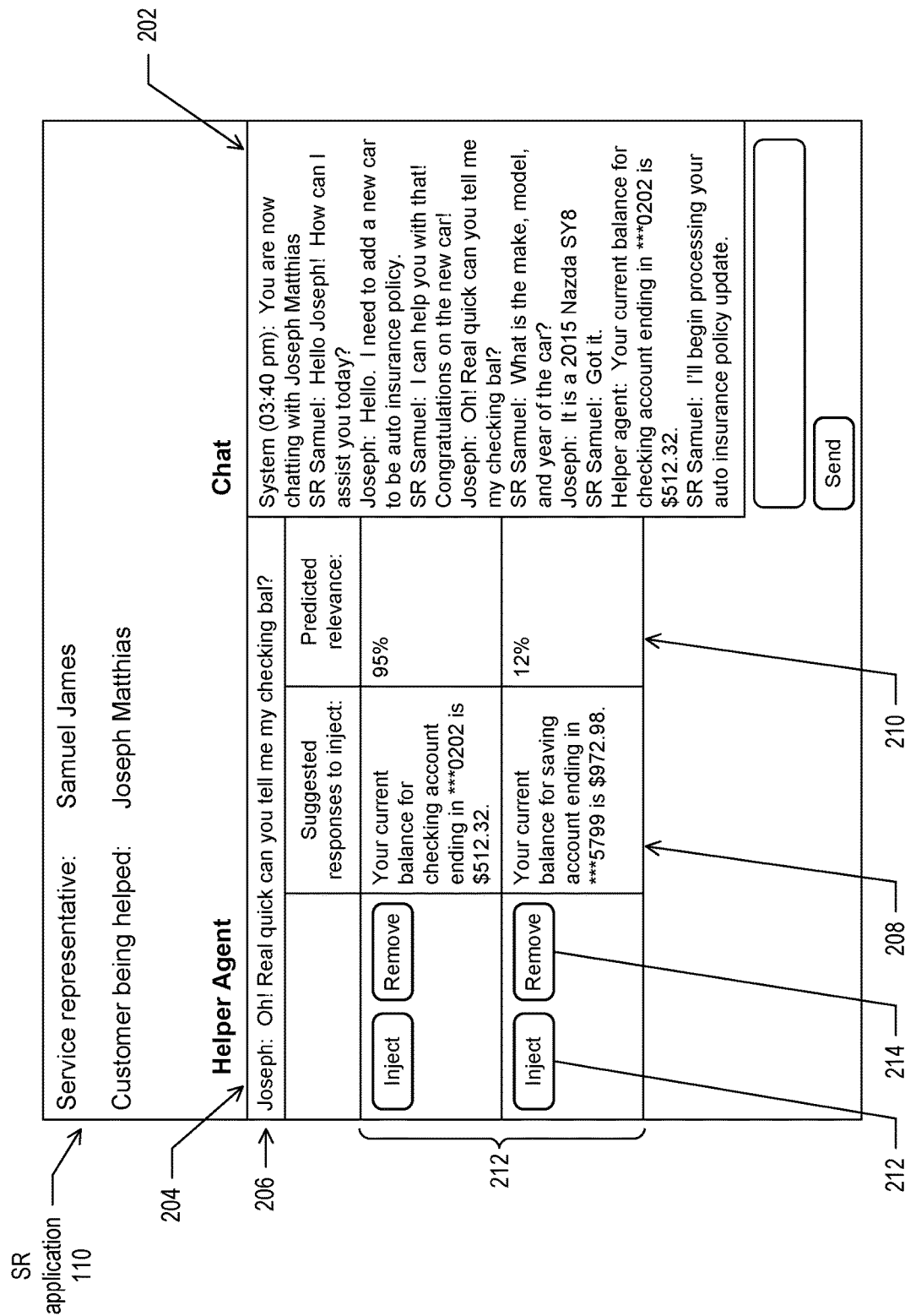
FIG. 2 depicts an example of a service representative application user interface, according to implementations of the present disclosure.

FIG. 2 depicts an example of a UI that may be presented within the SR application 110, according to implementations of the present disclosure. As shown in this example, the UI can include a chat window 202 displaying the communications that have been exchanged between the individual and the SR during the service session. Each communication may be presented with an indication of who sent the communication (e.g., SR or individual) and when the communication was sent (and/or received). As shown in the example, the chat window can include controls that let the user enter a new text communication and send the new text communication to the other party.

The UI can also include a section 204 that is output from the intelligent agent 116 (e.g., the Helper Agent for the SR). The section 204 can include a presentation 206 of the communications that have been flagged as indicating a topic broached by the individual. In this example, the agent has analyzed the individual's communications to identify the individual's communication "Oh! Real quick can you tell me my checking bal?" as possibly indicating a topic of checking account balance. The agent has generated messages based on this inferred topic, and the messages are displayed in a list 212 in the agent output 204. In some implementations, as shown in this example, each message 208 is presented in the list 212 along with its associated confidence score 210 (e.g., "predicted relevance") and controls 212 and 214 to allow the SR to inject the message into the conversation or remove the message from the displayed list of messages 212. In this example, the SR 102 has selected the highest confidence message and entered the command to inject it into the conversation. The message "Your current balance for checking account ending in ***0202 is $512.32" appears in the chat windows of both participants. In this example, the injected message is displayed with an indication (e.g., "Helper agent") that it is generated by the intelligent agent. In some implementations, the message(s) presented in the UI in the list 212 are those message(s) for which the confidence score is at least a threshold confidence level (e.g., 5% or greater). The agent section 204 can include any suitable number of sub-sections that each presents a topic indicator 206 and any suitable number of messages generated based on that topic.

Figure 3:
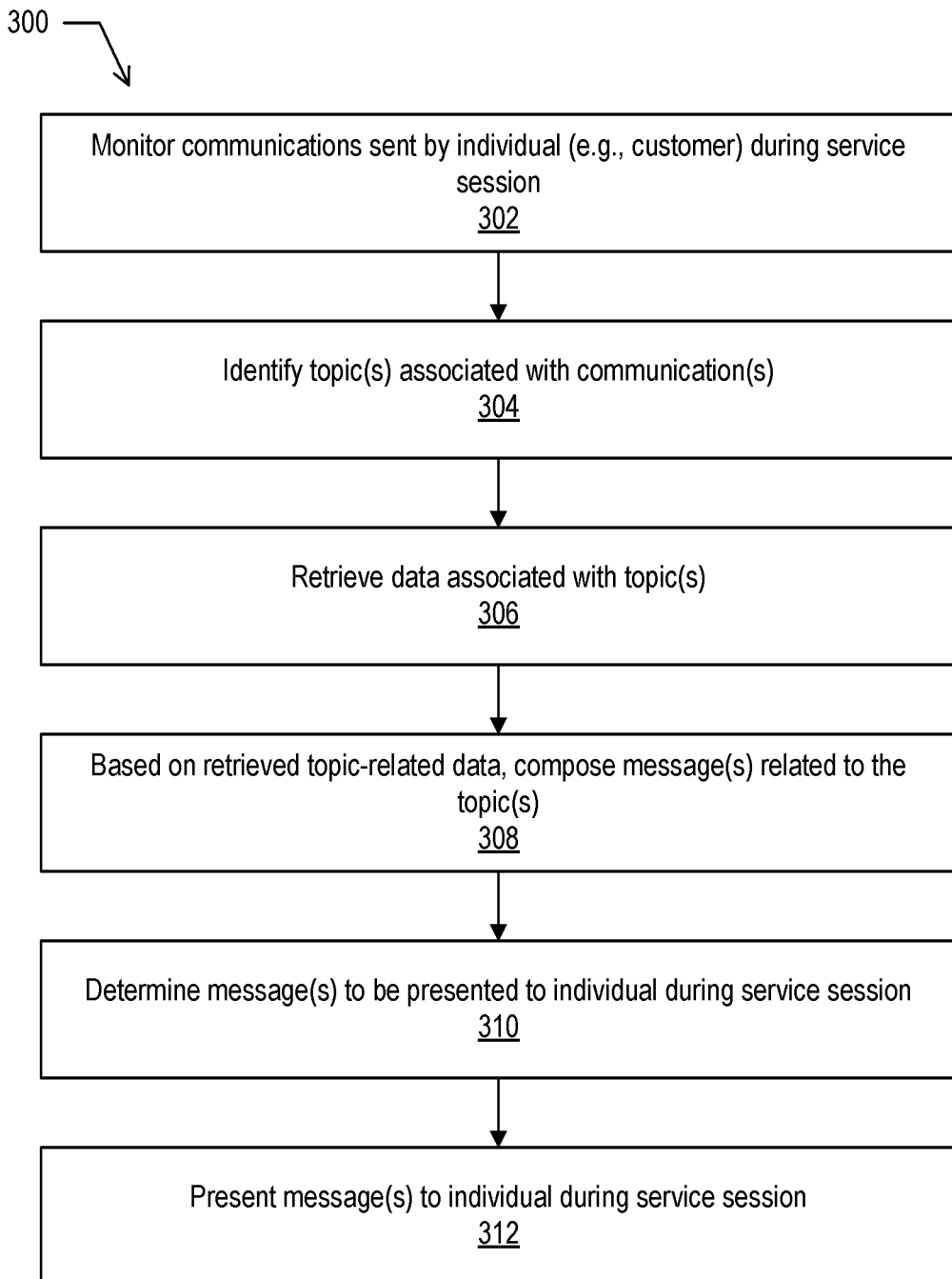
FIG. 3 depicts a flow diagram of an example process for providing information during a service session, according to implementations of the present disclosure.

FIG. 3 depicts a flow diagram 300 of an example process for providing information during a service session, according to implementations of the present disclosure. Operations of the process can be performed by one or more of the SR application 110, the agent 116, the tokenizer 120, the topic analyzer 122, the message generator 124, the ML module(s) 126, and/or other software module(s) executing on the SR device 108, the analysis device(s) 118, and/or elsewhere.

The communications of the individual 104 during the service session 106 are monitored (302) during the service session 106 as described above, and the communications are analyzed. Based on the analysis of the communications, one or more topics are identified (304) that have been broached by the individual during the service session 106. The data 130 associated with the topic(s) is retrieved (306), and message(s) 132 are composed (308) based on the retrieved data 130.

A determination is made (310) which of the message(s) 132, if any, are to be injected into the service session 106 and thus presented to the individual 104 during the service session 106. In some implementations, as described above, the message(s) 132 to be injected are selected by the SR 102 from a list of possible candidate message(s) 132 generated by the agent 116 and presented to the SR 102. Alternatively, in some implementations, the highest confidence candidate message is automatically generated without requiring the explicit approval of the SR 102. In some implementations, a message may be automatically injected into the service session 106 if its confidence score is at least a threshold confidence level. For example, a message 132 may not be automatically injected (e.g., without SR 102 approval) unless its confidence score is at least 80%. The injected messages are presented (312) to the individual during the service session 106, as described above.

Figure 4:
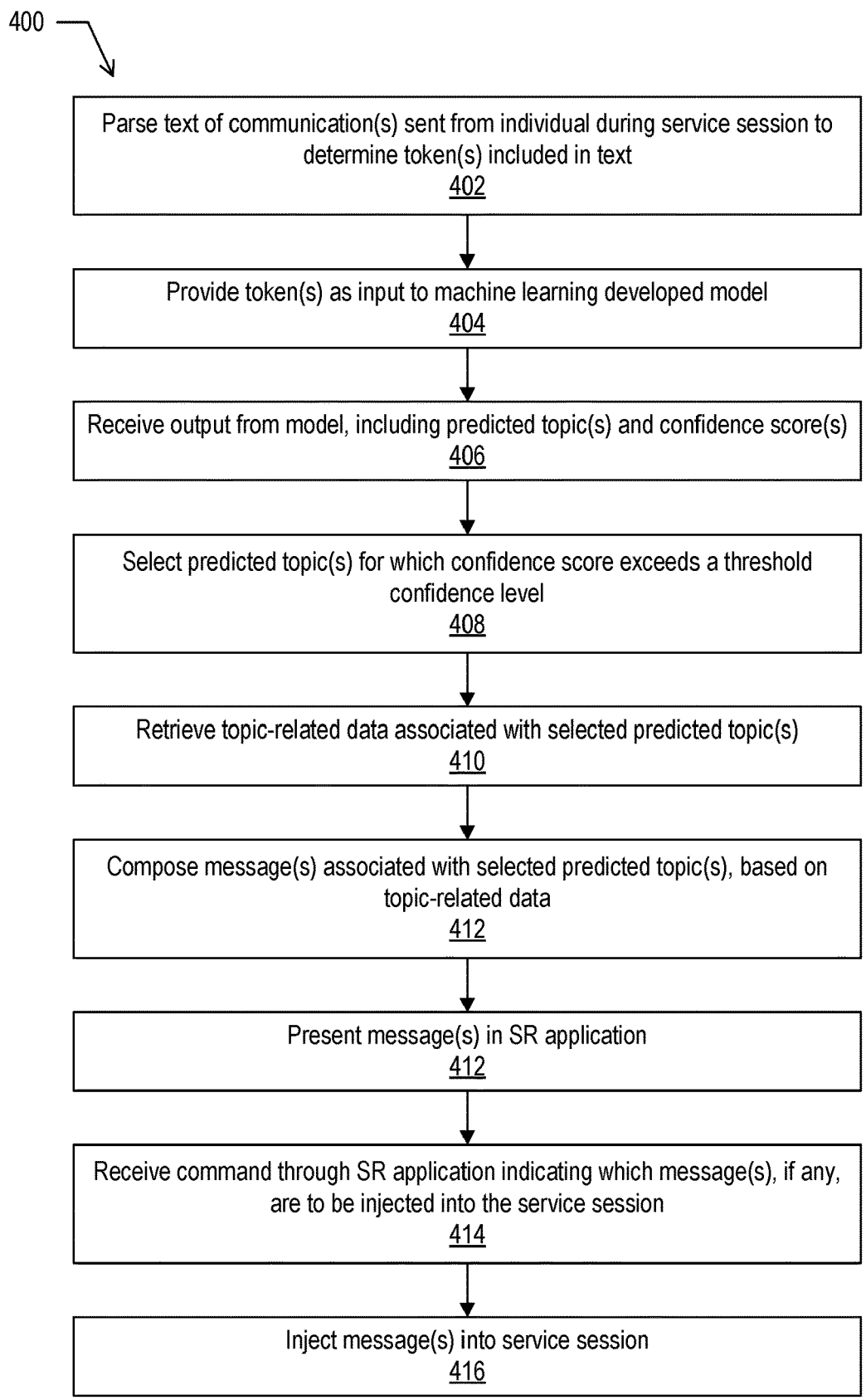
FIG. 4 depicts a flow diagram of an example process for providing information during a service session, according to implementations of the present disclosure.

FIG. 4 depicts a flow diagram 400 of an example process for providing information during a service session, according to implementations of the present disclosure. Operations of the process can be performed by one or more of the SR application 110, the agent 116, the tokenizer 120, the topic analyzer 122, the message generator 124, the ML module(s) 126, and/or other software module(s) executing on the SR device 108, the analysis device(s) 118, and/or elsewhere.

The text of the communications of the individual 104 during the service session 106 is parsed (402) or otherwise analyzed to determine one or more tokens included in the communications. In instances where the communications are initially text, the text itself may be tokenized as described above. In instances where the communications are audio communications, the audio may be transcribed using an appropriate STT engine and the text output from the STT engine may be tokenized.

The token(s) are provided (404) as input to a ML-trained model, which generates output based on the token(s) in the form of predicted topic(s) and an associated confidence score for each topic. This output is received (406) from the model.

In some implementations, one or more of the model-predicted topics are selected (408) based on their associated confidence score being at least a threshold confidence level. Topic-related data 130 is retrieved (410) that is associated with the selected predicted topic(s). One or more messages are composed (412) for each selected predicted topic, based on the retrieved data 130. The generated message(s) are presented (412) in the SR application, and a command is received (414) through the SR application indicating which of the message(s), if any, are to be injected into the service session. The indicated message(s) are injected (416) into the service session as described above.

Figure 5:
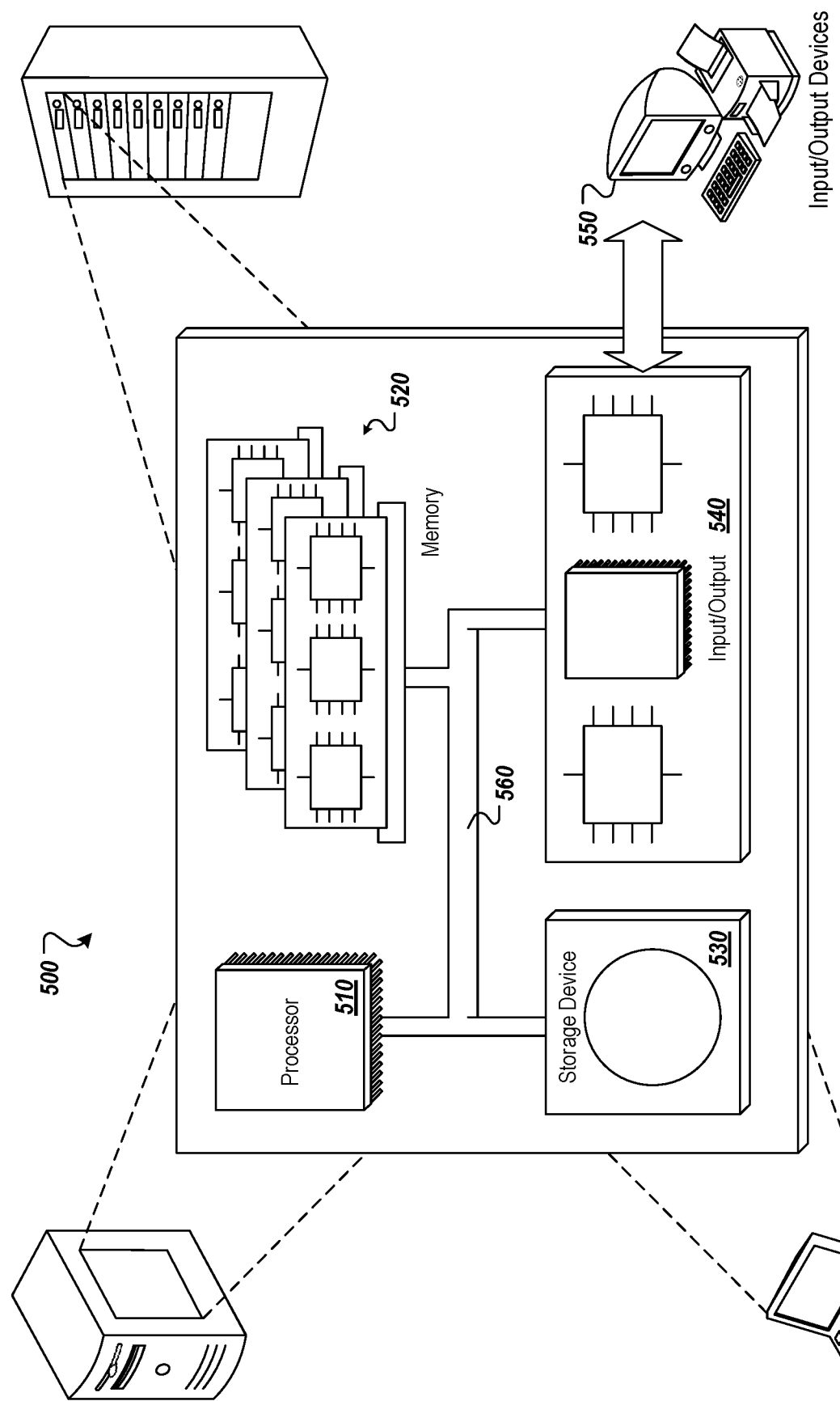
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the SR device 108, the analysis device(s) 118, the user device 112, and/or any other computing device(s) or computing system(s) discussed herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:
at least one processor; and
a memory communicatively coupled to the at least one processor, the memory storing instructions which, when executed by the at least one processor, cause:
monitoring, via the at least one processor, communications in a service representative application during a service session;
identifying, via the at least one processor, a plurality of topics associated with at least one of the communications;
determining, via the at least one processor, a plurality of topic confidence scores for the plurality of topics;
composing, via the at least one processor, at least one message for each topic of the plurality of topics having a topic confidence score of the plurality of topic confidence scores above a threshold topic confidence score;
determining, via the at least one processor, a message confidence score for each message of the at least one message;
presenting, via the at least one processor, each topic of the plurality of topics having the topic confidence score above the threshold topic confidence score, the at least one message for each topic of the plurality of topics having the topic confidence score above the threshold topic confidence score, and the message confidence score for each message of the at least one message, through a first portion of the service representative application;
receiving, via the at least one processor, an indication of a selected message of the at least one message;
determining, via the at least one processor, that the selected message is identical to a previous message selected during the service session;
modifying, via the at least one processor, the selected message to be different from the previous message to generate a modified selected message; and
presenting, via the at least one processor, the modified selected message through a second portion of the service representative application during the service session.

2. The system of claim 1, wherein the instructions, when executed by the at least one processor, cause:
retrieving, via the at least one processor, additional data associated with each topic of the plurality of topics; and
based on the additional data, composing, via the at least one processor, a plurality of candidate messages related to each topic of the plurality of topics, wherein the plurality of candidate messages comprises the at least one message.

3. The system of claim 1, wherein:
the service session is a text chat session; and
the selected message is presented as text in the text chat session.

4. The system of claim 1, wherein the selected message is presented with an indication that the selected message has been auto-generated.

5. The system of claim 1, wherein presenting, via the at least one processor, each topic of the plurality of topics having the topic confidence score above the threshold topic confidence score, the at least one message for each topic of the plurality of topics having the topic confidence score above the threshold topic confidence score, and the message confidence score for each message of the at least one message, through the first portion of the service representative application during the service session is performed autonomously by the system.

6. The system of claim 1, wherein:
each topic of the plurality of topics comprises a question of a plurality of questions provided during the service session; and
each message of the at least one message comprises an answer to the question.

7. The system of claim 1, wherein identifying, via the at least one processor, the plurality of topics includes:
parsing, via the at least one processor, text of the communications to determine one or more tokens included in the text; and
determining, via the at least one processor, the plurality of topics based on the one or more tokens.

8. The system of claim 7, wherein identifying, via the at least one processor, the plurality of topics includes:
provu, via the at least one processor, the one or more tokens as input to a model that has been developed, using machine learning, to identify the plurality of topics based on one or more input tokens; and
receiving, via the at least one processor, the plurality of topics that is identified by the model based on the one or more tokens.

9. The system of claim 1, wherein the first portion of the service representative application comprises a user interface configured to enable interaction by a service representative, and wherein the second portion of the service representative application comprises a chat window configured to enable viewing of the communications by the service representative and another user.

10. The system of claim 1, wherein the topic confidence score for a respective topic is indicative of a degree of confidence that the respective topic is present in the communications.

11. The system of claim 1, comprising identifying, via the at least one processor, one or more messages of the at least one message having a message confidence score above a threshold message confidence score, wherein presenting, via the at least one processor, each topic of the plurality of topics having the topic confidence score above the threshold topic confidence score, the at least one message for each topic of the plurality of topics having the topic confidence score above the threshold topic confidence score, and the message confidence score for each message of the at least one message, through the first portion of the service representative application comprises presenting, via the at least one processor, each topic of the plurality of topics having the topic confidence score above the threshold topic confidence score, the one or more messages having the message confidence score above the threshold message confidence score, and the message confidence score for each message of the one or more messages through the first portion of the service representative application, and wherein the one or more messages comprise the selected message.

12. A computer-implemented method performed by at least one processor, the method comprising:
monitoring, by the at least one processor, communications of a user in a service representative application during a service session;
identifying, by the at least one processor, a main inquiry in the communications;
identifying, by the at least one processor, a main topic associated with the main inquiry;
identifying, by the at least one processor, one or more side inquiries in the communications, wherein each side inquiry of the one or more side inquiries is introduced in the communications subsequent to introduction of the main inquiry;
identifying, by the at least one processor, one or more side topics associated with the one or more side inquiries based on demographic characteristics of the user, wherein each side topic of the one or more side topics is associated with a side inquiry of the one or more side inquiries;
determining, by the at least one processor, a confidence score for each side topic of the one or more side topics;
composing, by the at least one processor, at least one message, wherein each message of the at least one message is related to a side topic of the one or more side topics having a confidence score above a threshold confidence score;

presenting, by the at least one processor, the one or more side topics and the at least one message through a first portion of the service representative application;
receiving, by the at least one processor, an indication of a selected message of the at least one message; and
presenting, by the at least one processor, the selected message through a second portion of the service representative application during the service session.

13. The method of claim 12, comprising:
receiving, by the at least one processor, a command to present the selected message through the second portion of the service representative application, the command entered through the first portion of the service representative application; and
presenting, by the at least one processor, the selected message through the second portion of the service representative application in response to receiving the command.

14. The method of claim 12, comprising:
retrieving, by the at least one processor, additional data associated with each side topic of the one or more side topics;
based on the additional data, composing a plurality of candidate messages related to each side topic of the one or more side topics, wherein the plurality of candidate messages comprises the at least one message; and
selecting, by the at least one processor, the at least one message to be presented from the plurality of candidate messages.

15. The method of claim 14, wherein selecting, by the at least one processor, the at least one message includes:
presenting, by the at least one processor, the plurality of candidate messages through the first portion of the service representative application; and
receiving, by the at least one processor, a command provided through the service representative application to select the selected message from the plurality of candidate messages.

16. The method of claim 12, wherein:
the service session is a text chat session; and
the selected message is presented as text in the text chat session.

17. The method of claim 12, wherein presenting, by the at least one processor, the selected message through the second portion of the service representative application during the service session is performed autonomously by the at least one processor.

18. The method of claim 12, comprising:
determining, by the at least one processor, that the selected message is identical to a previous message selected during the service session;
modifying, by the at least one processor, the selected message to be different from the previous message to generate a modified selected message; and
presenting, by the at least one processor, the modified selected message through the second portion of the service representative application during the service session.

19. One or more non-transitory, computer-readable media storing instructions which, when executed by at least one processor, cause:
monitoring, via the at least one processor, communications in a service representative application during a service session;
identifying, via the at least one processor, a plurality of topics associated with at least one of the communications;

determining, via the at least one processor, a plurality of topic confidence scores for each respective topic of the plurality of topics;

composing, via the at least one processor, at least one message for each topic of the plurality of topics having a topic confidence score of the plurality of topic confidence scores above a threshold topic confidence score;

determining, via the at least one processor, a message confidence score for each message of the at least one message;

presenting, via the at least one processor, each topic of the plurality of topics having the topic confidence score above the threshold topic confidence score, the at least one message for each topic of the plurality of topics having the topic confidence score above the threshold topic confidence score, and the message confidence score for each message of the at least one message, through a first portion of the service representative application;

receiving, via the at least one processor, an indication of a selected message of the at least one message;

determining, via the at least one processor, that the selected message is identical to a previous message selected during the service session;

modifying, via the at least one processor, the selected message to be different from the previous message to generate a modified selected message; and presenting, via the at least one processor, the modified selected message through a second portion of the service representative application during the service session.

20. The one or more non-transitory, computer-readable media of claim 19, wherein the at least one message is composed using a machine learning model, and wherein the instructions cause training, via the at least one processor, the machine learning model to compose the at least one message based on the indication of the selected message.

* * * * *